US00RE41171E

(19) United States
(12) Reissued Patent
Howe, Jr.

(10) Patent Number: US RE41,171 E
(45) Date of Reissued Patent: Mar. 30, 2010

(54) SYSTEM FOR MONITORING A PERSON'S LOCATION IN A DEFINED AREA

(76) Inventor: Paul E. Howe, Jr., 2537 Armstrong Valley Rd., Murfreesboro, TN (US) 37128

(21) Appl. No.: 12/157,615

(22) Filed: Oct. 4, 2007

Related U.S. Patent Documents

Reissue of:
(64) Patent No.: 7,205,889
Issued: Apr. 17, 2007
Appl. No.: 11/007,762
Filed: Dec. 8, 2004

(51) Int. Cl.
*G08B 1/08* (2006.01)

(52) U.S. Cl. ..... 340/539.13; 340/572.1; 340/573.1; 235/375

(58) Field of Classification Search ..... 340/545.6, 340/539.13, 572.1, 539.1, 539.11, 573.1, 340/825.49; 235/375
See application file for complete search history.

(56) References Cited

U.S. PATENT DOCUMENTS 5,742,233 A * 4/1998 Hoffman et al. ..... 340/573.1
6,014,080 A * 1/2000 Layson, Jr. ..... 340/573.1
6,243,039 B1 * 6/2001 Elliot ..... 342/457
6,278,370 B1 * 8/2001 Underwood ..... 340/573.1
6,346,886 B1 * 2/2002 De La Huerga ..... 340/573.1
6,362,778 B2 * 3/2002 Neher ..... 342/357.07
6,396,403 B1 * 5/2002 Haner ..... 340/539.1
6,400,272 B1 * 6/2002 Holtzman et al. ..... 340/572.1
6,424,264 B1 * 7/2002 Giraldin et al. ..... 340/573.1
D473,152 S * 4/2003 Frank ..... D10/104
6,569,011 B1 * 5/2003 Lynch et al. ..... 463/1
6,606,556 B2 * 8/2003 Curatolo et al. ..... 340/572.1
6,681,990 B2 * 1/2004 Vogler et al. ..... 235/385
6,843,415 B2 * 1/2005 Vogler ..... 235/375
6,963,277 B2 * 11/2005 Imasaki et al. ..... 340/539.1
6,989,741 B2 * 1/2006 Kenny et al. ..... 340/539.13
7,005,968 B1 * 2/2006 Bridgelall ..... 340/539.13
7,053,764 B2 * 5/2006 Stilp ..... 340/539.11

OTHER PUBLICATIONS www.safetzone.com, http://www.safetzone.com/stz_home.html accessed Jan. 31, 2005.*

* cited by examiner

*Primary Examiner*—John A Tweel, Jr.
(74) *Attorney, Agent, or Firm*—Dale J. Ream

(57) ABSTRACT

A system for monitoring a person's location in a defined area ("monitoring system") according to the present invention includes a plurality of ID badges remote from a plurality of ID readers and a CPU. Each ID badge includes a badge transmitter and a badge receiver, each ID reader includes a reader transmitter and a reader receiver. An alarm and a plurality of kiosks are preferably included. The respective ID readers detect the presence of the ID badges and communicate their respective positions to the CPU. If an ID badge exits the defined area or is disabled, the alarm is activated. The kiosks may be used to add interactivity to the monitoring system, and the ID badges may also include interactive elements. The CPU may perform various additional functions, such as directing a wearer of an ID badge to a destination and conveying information to the kiosks.

20 Claims, 9 Drawing Sheets

SYSTEM FOR MONITORING A PERSON'S LOCATION IN A DEFINED AREA

Matter enclosed in heavy brackets [ ] appears in the original patent but forms no part of this reissue specification; matter printed in italics indicates the additions made by reissue.

BACKGROUND OF THE INVENTION

This invention relates generally to a monitoring device. In particular, the present invention relates to a system for monitoring a person's location in a defined area.

In the United States alone, amusement parks currently attract more than 300 million visitors a year. Countless other people visit large indoor casinos, shopping malls, and similar destinations. Safety and convenience are important to these visitors, and a system that provides or enhances these qualities in a user-friendly and cost-effective manner would be welcomed. In particular, a system that eliminates child abductions, tracks lost guests, and helps guests communicate, navigate, and reunite would solve many problems associated with these destinations.

Various proposals for systems that monitor people are found in the art, such as in U.S. Pat. Nos. 5,742,233; 6,014,080; 6,243,039; 6,278,370; 6,362,778; 6,396,403; 6,569,011; and 6,606,556. While assumably effective for their intended purposes, none of the above proposals provide such an integrated and interactive system for monitoring people in a defined area that adds comparable safety and convenience. Therefore, it is desirable to have a system for monitoring a person's location in a defined area that is unobtrusive, can be used in a variety of settings, is able to monitor and distinguish between multiple people, activates an alarm when the system is disabled, adds convenience through such functions as mapping and directing, and is inexpensive.

SUMMARY OF THE INVENTION

A system for monitoring a person's location in a defined area ("monitoring system") according to the present invention includes a plurality of ID badges remote from a plurality of ID readers and a CPU. Each ID badge includes a badge transmitter and a badge receiver, each ID reader includes a reader transmitter and a reader receiver. An alarm and a plurality of kiosks are preferably included. The respective ID readers detect the presence of the ID badges and communicate their respective positions to the CPU. If an ID badge exits the defined area or is disabled, the alarm is activated. The kiosks may be used to add interactivity to the monitoring system, and the ID badges may also include interactive elements. The CPU may perform various additional functions, such as directing a wearer of an ID badge to a destination and conveying information to the kiosks.

The monitoring system may be employed in any defined area. A wearer of a respective ID badge may be automatically located and identified as follows. A respective ID reader transmitter sends a query signal to search for all nearby ID badges, and the respective wearer's ID badge receiver receives the query signal. The respective wearer's ID badge transmitter then sends a reply signal that includes a badge transmission identifier corresponding to the respective ID badge. The reply signal is received by the respective ID reader receiver. The respective ID reader then sends the reply signal along with a reader transmission identifier corresponding to the respective ID reader to the CPU. When the CPU receives the respective reply signal, it uses its programming or circuitry to recognize the respective badge and reader transmission identifiers and to associate these respective identifiers with the corresponding ID badge and ID reader. Thus, the location of the respective ID badge is known to the CPU.

These functions may be implemented using RFID (Radio Frequency Identification) technology. Essentially, a stationary reader sends out a radio signal of a particular frequency. A "tag" or "badge" responds to this signal by "replying" in a way that alerts the reader that the tag has just entered its range. This information can then be used to draw conclusions about the location of the tagged object. In passive RFID systems, the tag does not require a battery. Instead, the energy of the reader signal provides the energy necessary to reply. The circuitry required is exceedingly small—not much bigger than a grain of rice. These devices can also be very unobtrusive and have lengthy life-spans. The largest disadvantage of passive systems is that the reader must provide a powerful transmission in order to power the tag. This results in large power requirements and limits the signal range. Generally the tag must be within a few feet of the reader to be "seen".

Active RFID systems are powered by a battery onboard the tag. When the tag detects the reader signal, it transmits a reply. Some active systems have a range of hundreds of feet, but more importantly multiple tags can be identified simultaneously. The tag can also respond independently of the reader, such as activating if an attempt is made to disable it.

Therefore, a general object of this invention is to provide a system for monitoring a person's location in a defined area that affords security by protecting against abductions.

Another object of this invention is to provide a system for monitoring a person's location in a defined area, as aforesaid, that adds convenience for the system's users.

Still another object of this invention is to provide a system for monitoring a person's location in a defined area, as aforesaid, that can be used in a variety of conditions, such as inside, outside, etc.

Yet another object of this invention is to provide a system for monitoring a person's location in a defined area, as aforesaid, that is able to monitor and distinguish between multiple people.

A further object of this invention is to provide a system for monitoring a person's location in a defined area, as aforesaid, that activates an alarm when the system is disabled.

A still further object of this invention is to provide a system for monitoring a person's location in a defined area, as aforesaid, that is cost-effective.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

A system for monitoring a person's location in a defined area according to the present invention will now be described in detail with reference to FIGS. 1 through 9 of the accompanying drawings. More particularly, a system for monitoring a person's location in a defined area ("monitoring system") 100 includes a plurality of ID badges 110 remote from a plurality of ID readers 120 and a CPU 140 (FIGS. 3 and 4).

Figure 3:
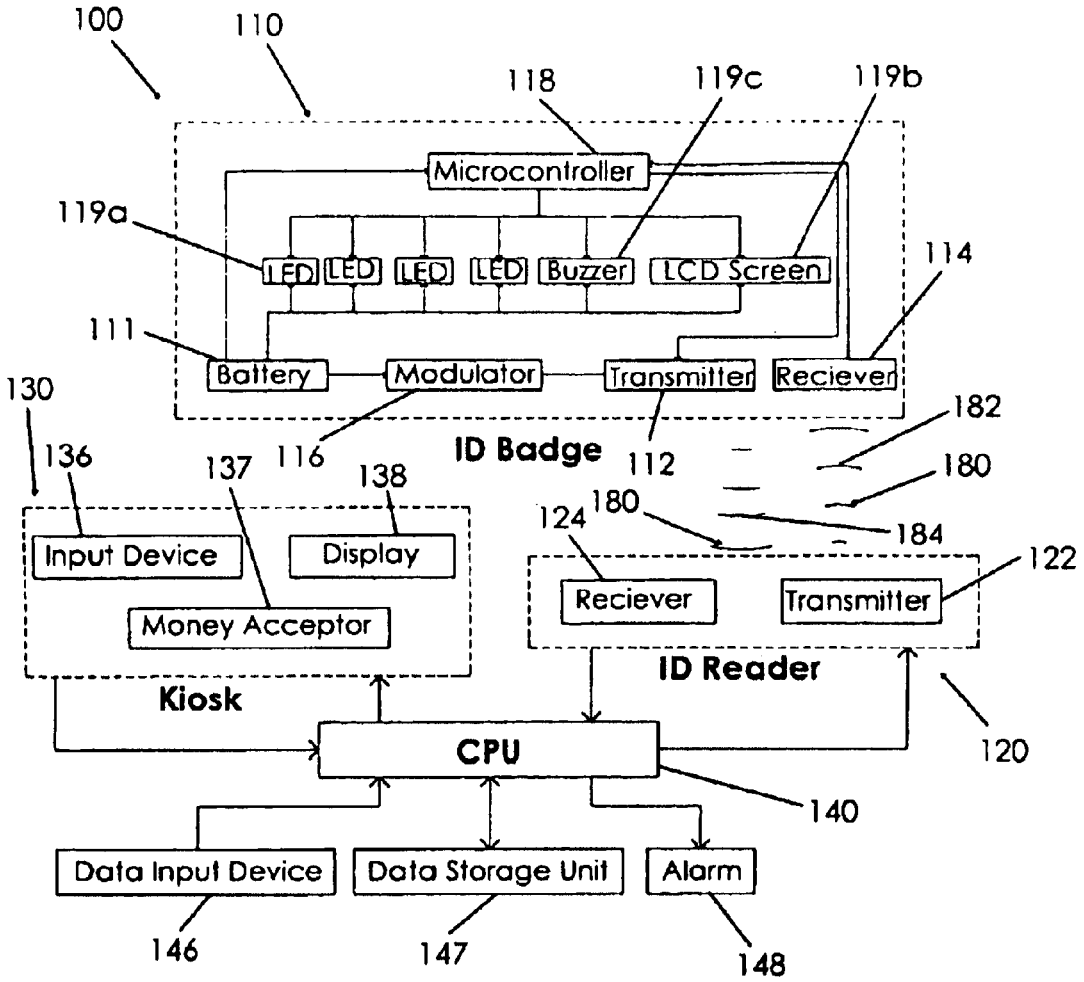
FIG. 3 is a block diagram showing the components of the monitoring system according to the present invention.
Figure 4:
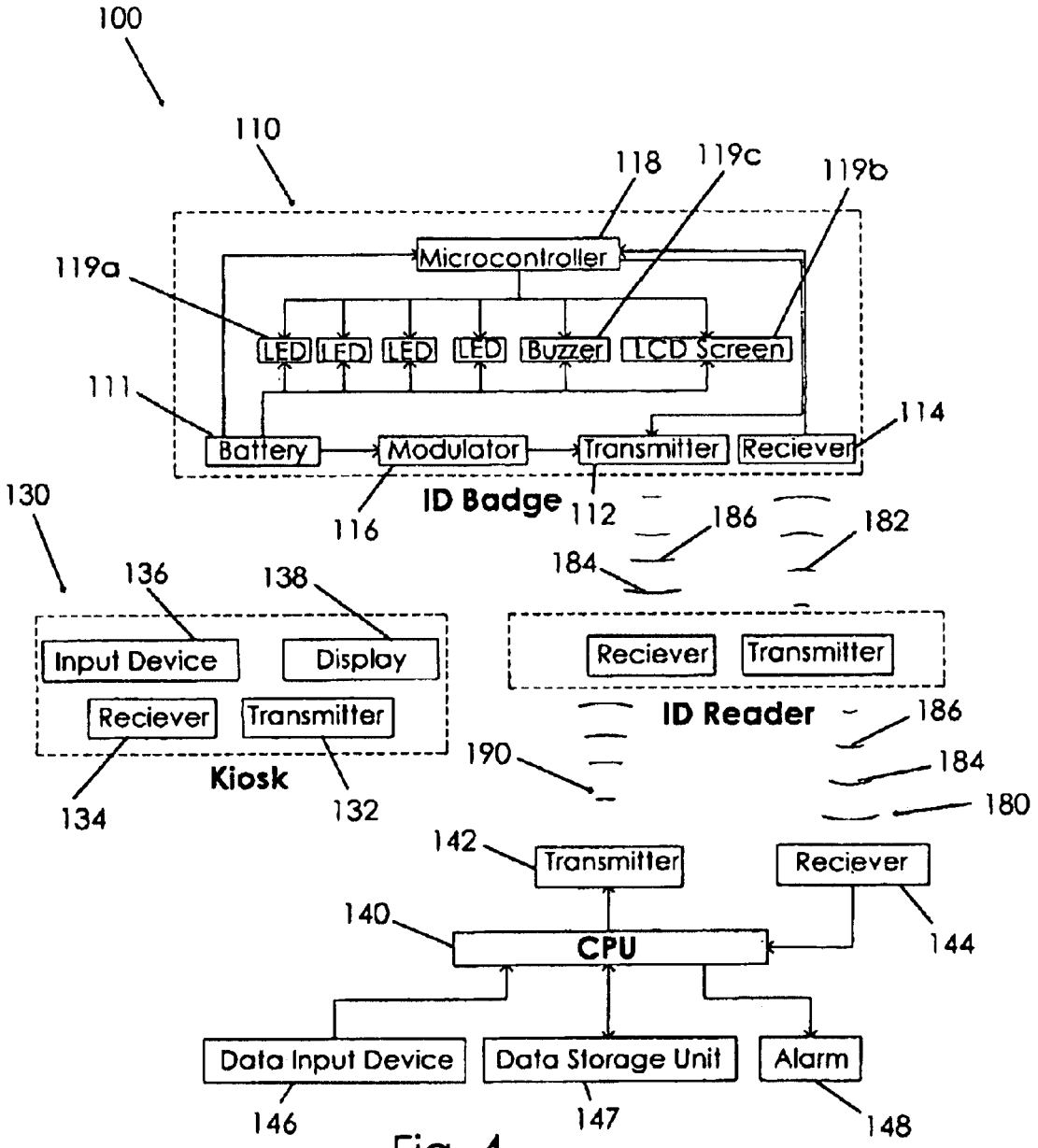
FIG. 4 is a block diagram showing the components of the monitoring system according to another aspect of the present invention.

Each respective ID badge 110 has a badge receiver 114 for receiving query signals 182 from a respective ID reader 120 and a badge transmitter 112 for transmitting reply signals 184 and alarm signals 186 (FIGS. 3 and 4). Each respective badge transmitter 112 has a predetermined badge transmission identifier different from a predetermined badge transmission identifier of any other badge transmitter 112, and each respective ID badge 110 includes means 116 (FIGS. 3 and 4) for including a respective badge transmission identifier in respective reply and alarm signals 184, 186. The tag transmission identifier is preferably a unique modulation, though other identifiers are of course possible. This unique modulation may be obtained by including a respective modulator in each respective ID badge 110, though other devices known in the art may be used.

Each respective ID badge 110 preferably includes a microcontroller 118 in communication with a power source 111 and a display 119 for conveying information to a wearer of the respective ID badge 110 (FIGS. 3 and 4). The display 119 is preferably a LED 119a array or a LCD screen 119b (FIG. 1), though other types of displays would also be appropriate, including audio displays 119c (FIG. 3). Each microcontroller 118 preferably includes programming or circuitry to actuate the transmission of an alarm signal 186 by the respective badge transmitter 112 if the respective ID badge 110 is disabled.

While other technologies may be used, the plurality of ID readers 120 is preferably a plurality of RFID readers 120 and the plurality of ID badges 110 is preferably a plurality of RFID badges 110. To be more specific, each respective RFID badge 110 is preferably an active RFID badge 110 having the power source 111 for powering the respective ID badge transmitter 112.

Each respective ID reader 120 has a reader transmitter 122 for transmitting query signals 182, other unprocessed signals 180, and processed signals 190 and a reader receiver 124 for receiving respective unprocessed and processed signals 180, 190 (FIGS. 3 and 4). The processed signals 190 include all signals originating from the CPU 140, and the unprocessed signals 180 include all signals not originating from the CPU 140. Each respective ID reader 120 has a predetermined reader transmission identifier different from a predetermined reader transmission identifier of any other ID reader 120 and circuitry or other means for including the respective reader transmission identifier in communications with the CPU 140.

The CPU 140 may be in communication with a data input device 146 for inputting data to the CPU 140 (FIGS. 3 and 4). A data storage unit 147 is in communication with the CPU 140 for maintaining ID badge information (FIGS. 3 and 4). The CPU 140 may also be in communication with a CPU transmitter 142 for transmitting respective processed signals 190 to the respective ID reader receivers 124 and a CPU receiver 144 for receiving respective unprocessed signals 180 from the respective ID reader transmitters 122 (FIG. 4).

The CPU 140 is programmed to recognize a respective badge transmission identifier included in respective reply and alarm signals 184, 186 and to associate the respective badge transmission identifier with a corresponding ID badge 110. The CPU 140 is also programmed to recognize a respective reader transmitter identifier included in communications from respective ID readers 120 and to associate the respective reader transmitter identifier with a corresponding ID reader 120. The CPU 140 may also be programmed to selectively associate together respective ID badges 110 for allowing a wearer of one associated ID badge to access information about a wearer of another associated ID badge 110. The CPU 140 may of course include circuitry for completing the above-mentioned tasks instead of being programmed to do so.

While the means for communicating between the CPU 140 and the plurality of ID readers 120 preferably includes the CPU transmitter 142, the CPU receiver 144, the ID reader transmitter 122, and the ID reader receiver 124 as described above (FIG. 4), other means for communicating are possible. There may be an electrical connection between the CPU 140 and the plurality of ID readers 120, for example (FIG. 3).

The monitoring system 100 may also include a plurality of kiosks 130 (FIGS. 3 and 4). The respective kiosks 130 may be remotely positioned in a spaced-apart relationship relative to the CPU 140 for allowing a respective wearer of a respective ID badge 110 to access information from the CPU 140 that is pertinent to himself. Each respective kiosk 130 may include a kiosk input device 136 for inputting data (FIGS. 3 and 4), a kiosk display 138 for displaying information (FIGS. 3 and 4), a kiosk transmitter 132 for transmitting respective unprocessed signals 180 (FIG. 4), and a kiosk receiver 134 for receiving respective processed signals 190 (FIG. 4). At least one kiosk 130 may also include a money acceptor 137 (FIG. 3). The kiosk transmitter 132, the kiosk receiver 134, the ID reader transmitter 122, and the ID reader receiver 124 may be cooperatively used to communicate respective unprocessed and processed signals 180, 190 between the kiosk 130 and the ID reader 120. Other means of communicating are of course possible, however. There may be an electrical connection between a respective kiosk 130 and a respective ID reader 120, for example. A respective ID reader 120 may be positioned adjacent each respective kiosk 130 for detecting the presence of a respective ID badge 110.

If at least one kiosk 130 includes a money acceptor 137, the CPU 140 may be programmed to associate a respective amount of money with a respective ID badge 110 and to update the respective amount of money associated with a respective ID badge 110 according to an amount of money accepted by the money acceptor 137. The CPU 140 may of course include circuitry for completing the above-mentioned tasks instead of being programmed to do so.

Figure 1:
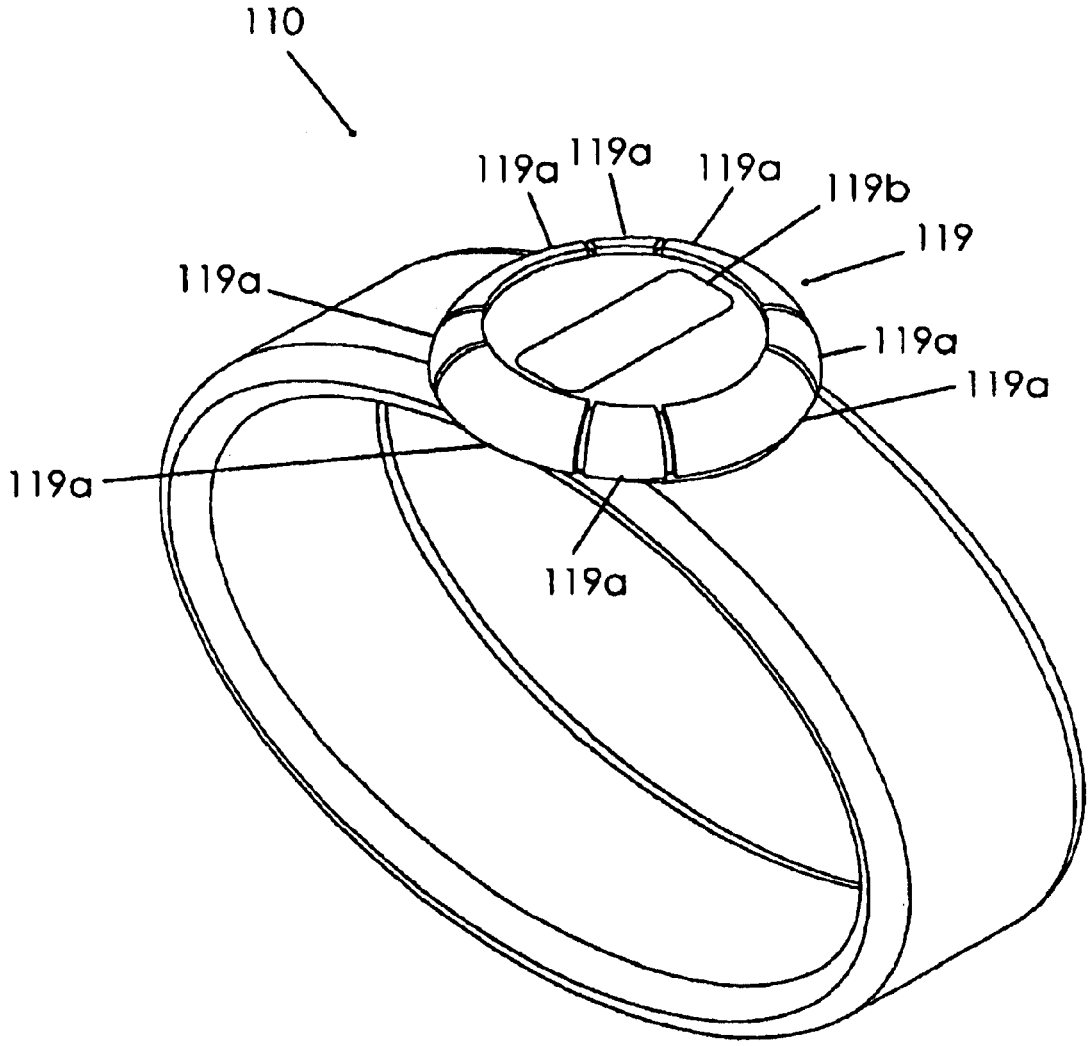
FIG. 1 is a perspective view of an ID badge according to the present invention.

The CPU 140 may include circuitry or programming for guiding an ID badge 110 wearer to a destination determined by the wearer at a respective kiosk 130. This preferably includes selectively actuating a respective ID badge display 119. In the preferred embodiment, respective ID badge displays 119 include a plurality of LEDs 119a positioned in an array to indicate direction, each respective LED 119a having a respective position in the array indicative of a respective direction. The array is preferably a circular array (FIG. 1). Actuating a respective ID badge display 119, then, includes selectively actuating a respective LED 119a according to the position of the respective LED 119a in the array.

An alarm 148 may be electrically connected to the CPU 140 (FIGS. 3 and 4). Each respective ID badge 110 may contain circuitry or programming for actuating transmission of a respective alarm signal 186 on demand and if the respective ID badge 110 is removed or disabled. The CPU 140 may include circuitry or programming for actuating the alarm 148 when the CPU 140 receives a respective alarm signal 186.

In use, the monitoring system 100 may be employed in any defined area, such as an amusement park. At an entrance point or some other predetermined point, respective ID badges 110 are attached to respective wearers. Fees may of course be charged for using the monitoring system 100. The CPU 140 associates the respective ID badges 110 with their wearers and may also selectively associate together respective ID badges 110 to correspond to groups or parties. This information is stored in the data storage unit 146.

The respective ID readers 120 are strategically located throughout the defined area. Respective ID readers 120 are ideally located adjacent all path bottlenecks, adjacent all entrances and exits to the defined area, adjacent at least one attraction, and as further required to maintain broad (though not necessarily comprehensive) coverage. If a respective ID reader 120 is positioned adjacent at least one attraction, the CPU preferably includes programming or circuitry for determining a wait time at the attraction based upon the number of ID badges 110 detected at the attraction. This wait time may be determined very accurately because the number of ID badges 110 in line may be precisely known.

Figure 2:
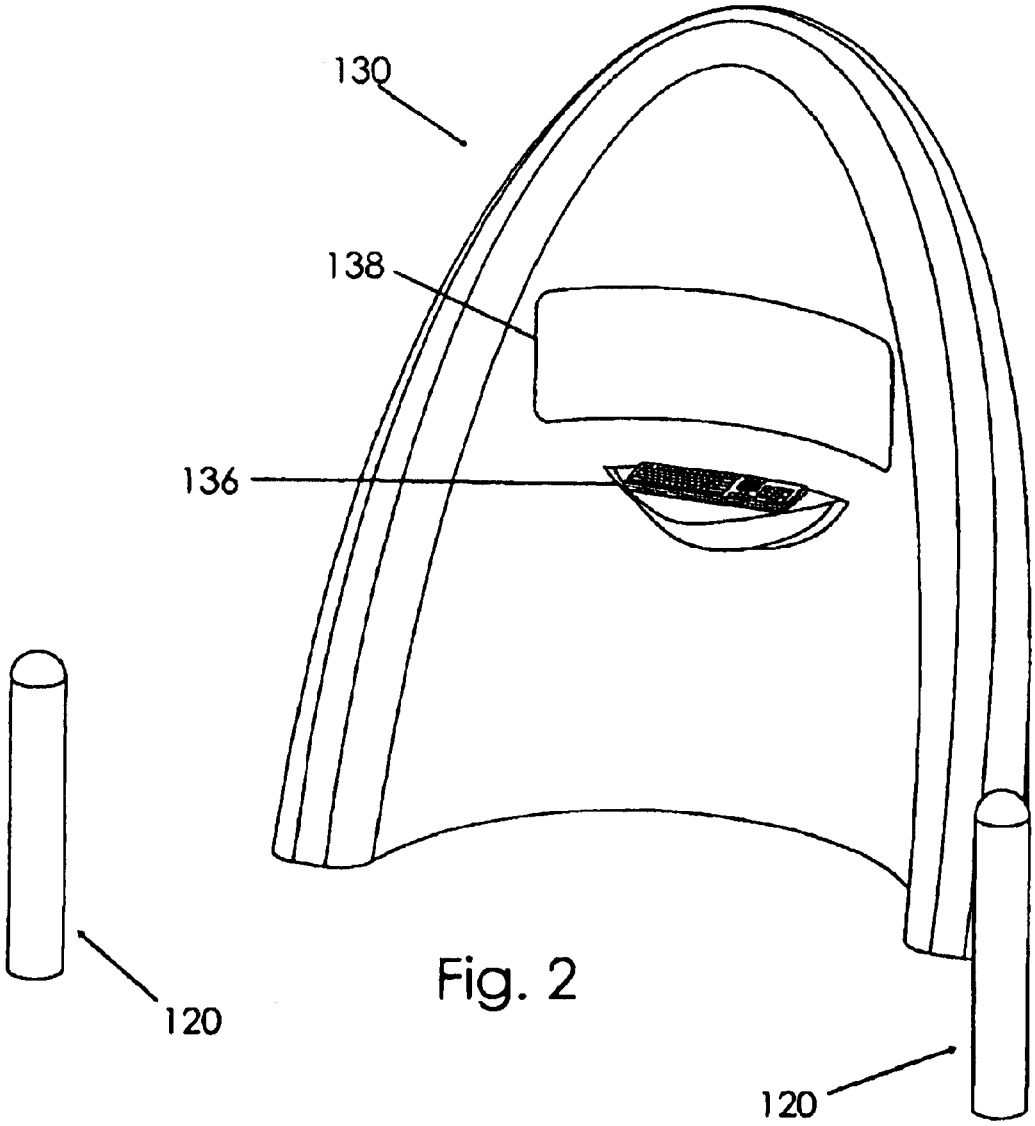
FIG. 2 is a perspective view of a kiosk and two ID readers according to the present invention.

The respective kiosks 130 may also be strategically located throughout the defined area, with the emphasis being on locating the respective kiosks 130 conveniently for the respective wearers and away from path bottlenecks to keep from hindering traffic flow. As noted above, a respective ID reader 120 is preferably located adjacent each respective kiosk 130 so that when a respective wearer approaches a respective kiosk 130 he may be automatically identified and information pertinent to him may be automatically displayed on the respective kiosk display 138 (FIG. 2). This means the respective wearer does not have to manually input his identification through the kiosk input device 136.

A respective wearer may be automatically located and identified as follows. The respective ID reader transmitter 122 sends a query signal 182 to search for a nearby ID badge 110, and the respective wearer's ID badge receiver 114 receives the query signal 182 (FIG. 3). The respective wearer's ID badge transmitter 112 then sends a reply signal 184 that includes the badge transmission identifier corresponding to the respective ID badge 110 (FIG. 3). The reply signal 184 is received by the ID reader receiver 124 (FIG. 3). The ID reader 120 then sends the reply signal 184 along with the reader transmission identifier corresponding to the respective ID reader 120 to the CPU 140. This may be accomplished using the respective ID reader transmitter 122 and the CPU receiver 144 (FIG. 4) or through an electrical connection as noted above (FIG. 3). When the CPU 140 receives the respective reply signal 184, it uses its programming or circuitry to recognize the respective badge and reader transmission identifiers and to associate these respective identifiers with the corresponding ID badge 110 and ID reader 120. Thus, the location of the ID badge 110 is known to the CPU 140, and corresponding location information is maintained in the data storage unit 146.

When at a respective kiosk 130, the wearer of a respective ID badge 110 may use the respective kiosk input device 136 to request information from the CPU 140. An example of steps performed by the monitoring system 100 at an amusement park is shown in the flowcharts of FIGS. 5 through 8. It is understood that these steps correspond to a respective ID badge 110 and a respective kiosk 130.

In process step S1, the respective ID reader 120 adjacent the kiosk 130 detects an ID badge 110 as described in detail above. The process then proceeds to step S2, where the CPU 140 communicates personal data corresponding to the ID badge 110 to the kiosk 130. The process then proceeds to step S3, where the kiosk display 138 exhibits a park map with the location of the ID badge 110 and any associated ID badges 110 indicated. The wearer of the respective ID badge 110 then makes a selection using the kiosk input device 136. The process then proceeds to step S4.

In process step S4, the kiosk 130 determines whether the wearer of the ID badge 110 is selecting a ride. If so, the process is directed to step S5. If not, the process is directed to step S6.

Figure 5:
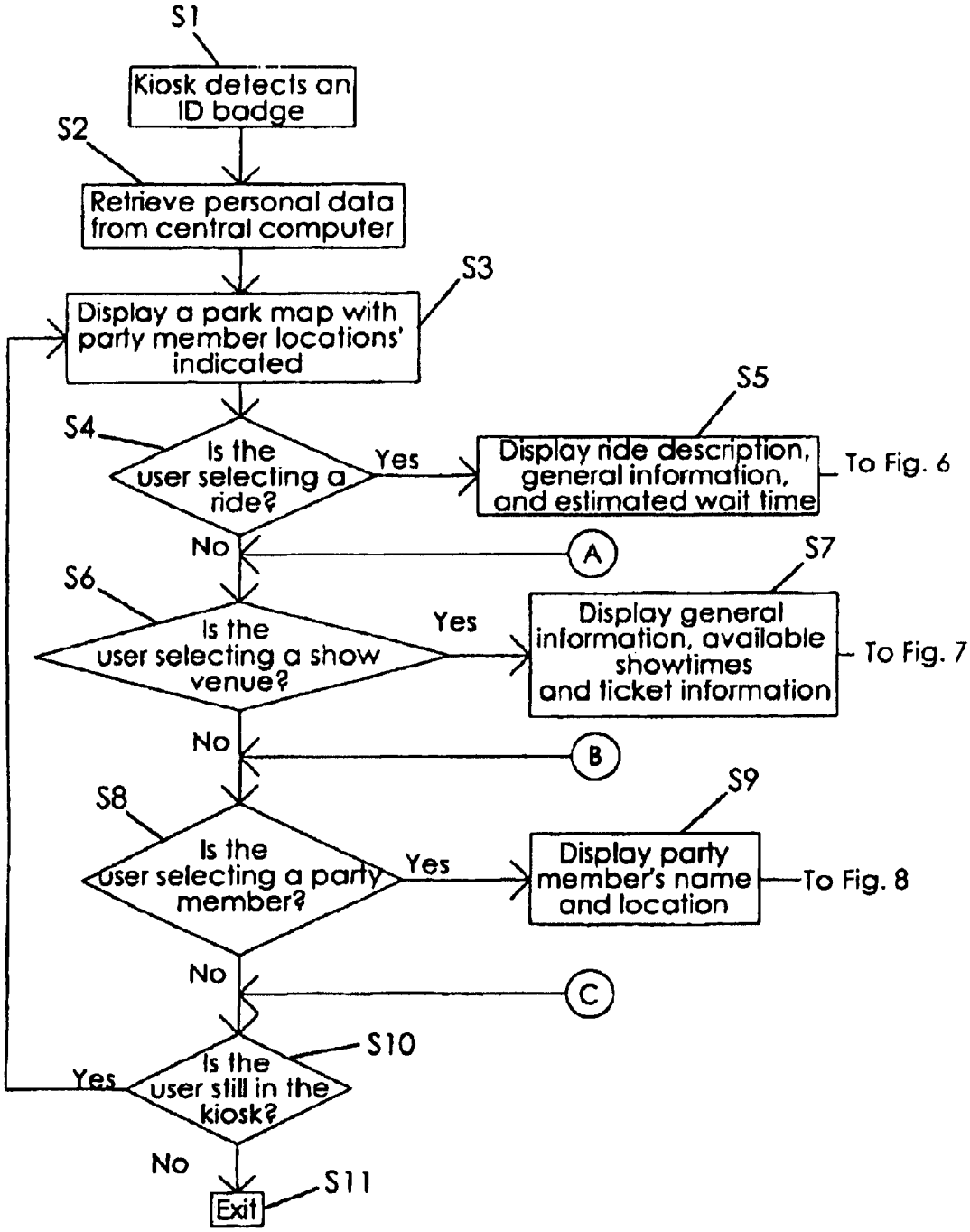
FIG. 5 is a flowchart illustrating one operation of the monitoring system as in FIGS. 3 and 4.
Figure 6:
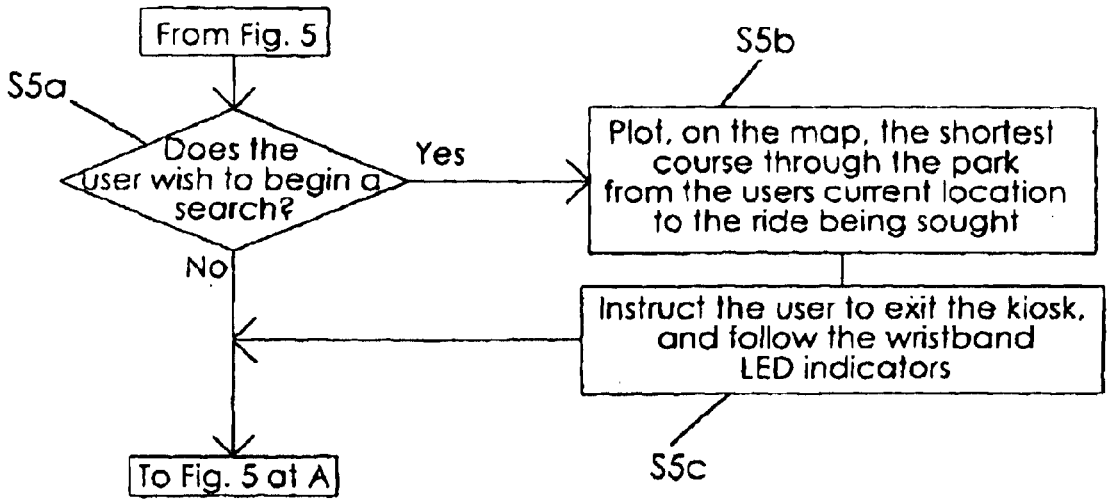
FIG. 6 is a flowchart supplementing the flow chart in FIG. 5.

In process step S5, the kiosk display 138 exhibits the ride description and other general information for the selected ride. The kiosk display 138 also exhibits an estimated wait time for the ride as communicated to the kiosk 130 by the CPU 140. The process then proceeds to step S5a (FIG. 6). In process step S5a, the kiosk display 138 inquires whether the wearer wishes to begin a search. If the wearer uses the kiosk input device 136 to indicate that he does wish to begin a search, the process is directed to step S5b. If the wearer uses the kiosk input device 136 to indicate that he does not wish to begin a search, the process is directed to step S6 (FIG. 5).

In process step S5b, the kiosk display 138 exhibits the shortest course through the park from the wearer's current location to the ride being sought. The process then continues to step S5c, where the kiosk display 138 instructs the wearer to exit the kiosk 130 and follow the directions on his ID badge display 119. The process then continues to step S6 (FIG. 5).

In process step S6, the kiosk 130 determines whether the wearer of the ID badge 110 selected a show venue in step S3. If so, the process is directed to step S7. If not, the process is directed to step S8.

Figure 7:
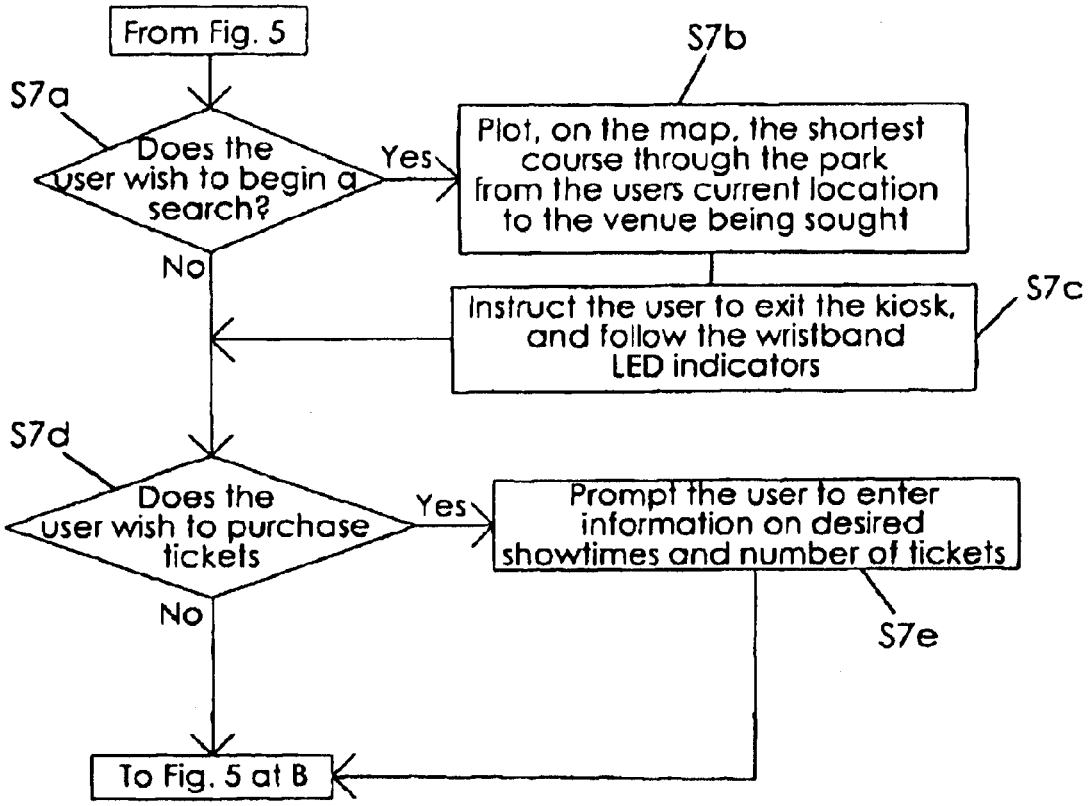
FIG. 7 is a flowchart supplementing the flow chart in FIG. 5.

In process step S7, the kiosk display 138 exhibits general information, available showtimes, and ticket information as communicated to the kiosk 130 by the CPU 140. The process then continues to step S7a (FIG. 7).

In process step S7a, the kiosk display 138 inquires whether the wearer wishes to begin a search. If the wearer uses the kiosk input device 136 to indicate that he does wish to begin a search, the process is directed to step S7b. If the wearer uses the kiosk input device 136 to indicate that he does not wish to begin a search, the process is directed to step S7d.

In process step S7b, the kiosk display 138 exhibits the shortest course through the park from the wearer's current location to the venue being sought. The process then continues to step S7c, where the kiosk display 138 instructs the wearer to exit the kiosk 130 and follow the directions on his ID badge display 119. The process then continues to step S7d.

In process step S7d, the kiosk display 138 inquires whether the wearer wishes to purchase tickets. If the wearer uses the kiosk input device 136 to indicate that he does wish to purchase tickets, the process is directed to step S7e. If the wearer uses the kiosk input device 136 to indicate that he does not wish to purchase tickets, the process is directed to step S8 (FIG. 5).

In process step S7e, the kiosk display 138 prompts the wearer to enter information on desired showtimes and number of tickets using the kiosk input device 136, and the wearer does so. The tickets may be purchased using money stored in an account corresponding to the respective ID badge, a credit or debit card, or cash accepted by the kiosk money acceptor 137. The process then continues to step S8 (FIG. 5).

In process step S8, the kiosk 130 determines whether the wearer of the ID badge 110 selected an associated ID badge 110 in step S3. If so, the process is directed to step S9. If not, the process is directed to step S10.

Figure 8:
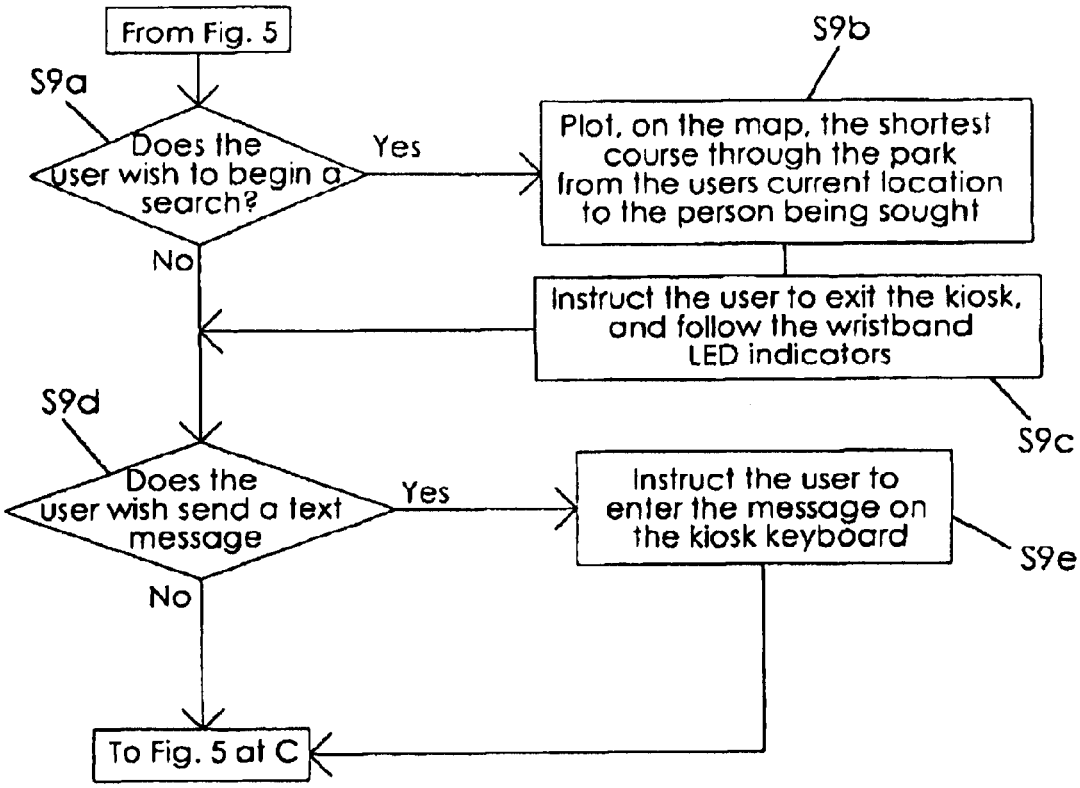
FIG. 8 is a flowchart supplementing the flow chart in FIG. 5.

In process step S9, the kiosk display 138 exhibits the name of the wearer of the associated ID badge 110 and the location of the associated ID badge 110. The process then continues to step S9a (FIG. 8).

In process step S9a, the kiosk display 138 inquires whether the wearer wishes to begin a search. If the wearer uses the kiosk input device 136 to indicate that he does wish to begin a search, the process is directed to step S9b. If the wearer uses the kiosk input device 136 to indicate that he does not wish to begin a search, the process is directed to step S9d.

In process step S9b, the kiosk display 138 exhibits the shortest course through the park from the wearer's current location to the wearer being sought. The process then continues to step S9c, where the kiosk display 138 instructs the wearer to exit the kiosk 130 and follow the directions on his ID badge display 119. The process then continues to step S9d.

In process step S9d, the kiosk display 138 inquires whether the wearer wishes to send a text message to the associated ID badge 110. If the wearer uses the kiosk input device 136 to indicate that he does wish to send a message, the process is directed to step S9e. If the wearer uses the kiosk input device 136 to indicate that he does not wish to send a message, the process is directed to step S10 (FIG. 5).

In process step S9e, the kiosk display 138 prompts the wearer to enter the message using the kiosk input device 136, and the wearer does so. The process then continues to step S10 (FIG. 5).

In process step S10, the CPU 140 determines whether the wearer of the respective ID badge 110 is still in the respective kiosk 130 by using information communicated from the adjacent ID reader 120. If so, the process is directed to step S3. If not, the process is directed to step S11, where the process is ended.

Figure 9:
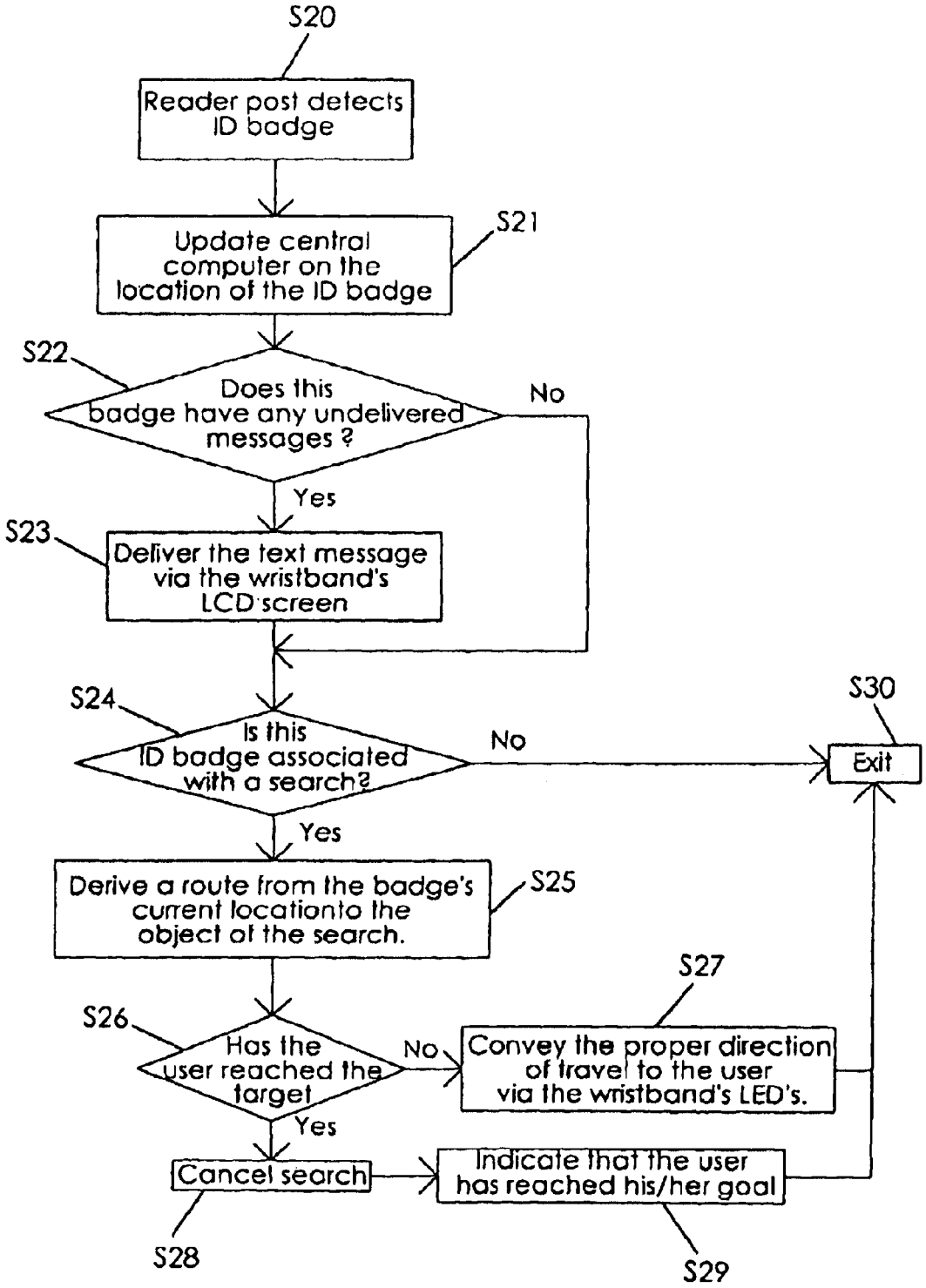
FIG. 9 is a flowchart illustrating another operation of the monitoring system as in FIGS. 3 and 4.

As shown above, a respective wearer may use the monitoring system 100 to guide the respective wearer in the defined area. A destination may be chosen using a kiosk 130, as described in steps S5a, S7a, and S9a above, for example. An example of steps performed by the monitoring system 100 in order to guide and direct a respective wearer to a destination is shown in the flowchart of FIG. 9.

In process step S20, a respective ID reader 120 detects the respective ID badge 110 by sending out query signals 182 using the respective ID reader transmitter 122. The respective ID badge receiver 114 receives these query signals 182, and the respective ID badge transmitter 112 transmits a reply signal 184 including its badge transmission identifier to the respective ID reader receiver 124 (FIG. 3). The process then continues to step S21, where the respective ID reader 120 communicates the location of the respective ID badge 110 to the CPU 140. The process then continues to step S22.

In process step S22, the CPU determines whether the respective ID badge 110 has any undelivered messages. If so, the process is directed to step S23. If not, the process is directed to step S24.

In process step S23, the CPU communicates any undelivered message to the respective ID reader 120, which in turn transmits the undelivered messages to the respective ID badge 110 using the respective ID reader transmitter 122 and the respective ID badge receiver 114. The respective ID badge 110 then displays the undelivered messages using the respective ID badge display 119 (FIG. 1). The process then continues to step S24.

In process step S24, the CPU 140 determines whether the respective ID badge 110 is associated with a search. If so, the process is directed to step S25. If not, the process is directed to step S30.

In process step S25, the CPU derives a route from the current location of the respective ID badge 110 to the destination. The process then continues to step S26, where the CPU 140 determines whether the respective ID badge 110 has reached the destination. If so, the process is directed to step S28. If not, the process is directed to step S27.

In process step S27, the CPU 140 communicates the proper direction of travel to the respective ID badge 110 using the respective ID reader 120. The respective ID badge display 119 conveys this direction to the wearer. The process then continues to step S30.

In process step S28, the CPU 140 cancels the search, and the process continues to step S29. In step S29, the CPU 140 communicates the fact that the wearer has reached his destination to the respective ID badge 110 using the respective ID reader 120. The process then continues to step S30.

In process step S30, the process is ended.

In addition to providing convenience as described above, the monitoring system 100 may be used to provide safety. The respective ID readers 120 located adjacent entrances and exits as described above detect any ID badge 110 attempting to leave the defined area. Furthermore, each respective ID badge microcontroller 118 notifies the CPU 140 by actuating the transmission of an alarm signal 186 by the respective ID badge transmitter 112 if the respective ID badge 110 is disabled. This protects against the abduction of the wearers of the respective ID badges 110 and keeps the wearers from wandering off.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A system for monitoring a person's location in a defined area, comprising:

a plurality of ID readers, each respective ID reader having a reader transmitter and a reader receiver for transmitting and receiving signals, respectively, each respective ID reader having a predetermined reader transmission identifier different from a predetermined reader transmission identifier of any other said ID reader, each respective ID reader including means for including a respective reader transmission identifier in a respective signal;

a plurality of ID badges remote from said plurality of ID readers, each respective ID badge having a badge receiver for receiving query signals from a respective ID reader and a badge transmitter for transmitting reply signals to a respective ID reader, each respective badge transmitter baying a predetermined badge transmission identifier different from a predetermined badge transmission identifier of any other said badge transmitter, each respective ID badge including means for including a respective badge transmission identifier in a respective reply signal;

a CPU in communication with a data storage unit for maintaining ID badge information, said CPU including means for recognizing a respective badge transmission identifier and means for associating said respective badge transmission identifier with a corresponding ID badge, said CPU including means for recognizing a respective reader transmission identifier and means for associating said respective reader transmission identifier with a corresponding ID reader;

means for communicating between said CPU and said plurality of ID readers;

a plurality of kiosks remotely positioned in a spaced-apart relationship relative to said CPU for allowing a respective wearer of a respective ID badge to access information from said CPU pertinent to said wearer;

means for communicating between said CPU and said plurality of kiosks;

wherein respective ID reader is positioned adjacent at least one attraction; and wherein said CPU includes means for determining a wait time at said at least one attraction based upon the number of said ID badges detected at said at least one attraction.

2. The system as in claim 1, wherein:

said plurality of ID readers is a plurality of RFID readers; and said plurality of ID badges is a plurality of RFID badges.

3. The system as in claim 2, wherein each said RFID badge is an active RFID badge having a power source for powering said respective ID badge transmitter.

4. The system as in claim 3, wherein each respective RFID badge includes a microcontroller and a display in communication with said microcontroller for conveying information to a wearer of said respective RFID badge.

5. The system as in claim 1, wherein each respective ID badge includes a microcontroller in communication with a plurality of LEDs and a power source for conveying information to a wearer of said respective ID badge.

6. The system as in claim 1 wherein:

each respective ID badge includes means for transmitting an alarm signal when said respective ID badge is removed or disabled;

said CPU is electrically connected to an alarm; and said CPU includes means for actuating said alarm when said CPU receives a respective alarm signal.

7. The system as in claim 1, wherein said CPU is in communication with a data input device for inputting data to said CPU.

8. The system as in claim 1, wherein each respective kiosk includes a kiosk input device and a kiosk display.

9. The system as in claim 1, wherein:

at least one said kiosk includes a money acceptor;

said CPU includes means for associating a respective amount of money with a respective ID badge; and said CPU includes means for updating a respective amount of money associated with a respective ID badge according to an amount of money accepted by said money acceptor.

10. The system as in claim 1, wherein a respective ID reader is positioned adjacent each respective kiosk for detecting the presence of a respective ID badge.

11. The system as in claim 1, wherein said means for communicating between said CPU and said plurality of ID readers includes an electrical connection between said CPU and said plurality of ID readers.

12. The system as in claim 1, wherein:

said means for communicating between said CPU and said plurality of kiosks includes an electrical connection between said CPU and said plurality of kiosks; and said means for communicating between said CPU and said plurality of ID readers includes an electrical connection between said CPU and said plurality of ID readers.

13. A system for monitoring people in a defined area, comprising:

a plurality of ID readers, each respective ID reader having a reader transmitter for transmitting unprocessed signals including query signals and a reader receiver for receiving reply signals, alarm signals, and processed signals;

a plurality of ID badges remote from said plurality of ID readers, each respective ID badge having a badge receiver for receiving said query signals from a respective ID reader and a badge transmitter for transmitting said reply signals and said alarm signals, each respective badge transmitter having a predetermined badge transmission identifier different from a predetermined badge transmission identifier of any other said badge transmitter, each respective ID badge including means for including a respective badge transmission identifier in respective reply and alarm signals;

a CPU in communication with a data storage unit for maintaining ID badge information, a CPU transmitter for transmitting processed signals, and a CPU receiver for receiving unprocessed signals, said CPU including means for recognizing a respective badge transmission identifier included in respective reply and alarm signals and means for associating said respective badge transmission identifier with a corresponding ID badge;

a plurality of kiosks remotely positioned in a spaced-apart relationship relative to said CPU for allowing a respective wearer of a respective ID badge to access information from said CPU pertinent to said wearer, each respective kiosk having a kiosk transmitter for transmitting said unprocessed signals and a kiosk receiver for receiving said processed signals;

wherein each respective kiosk includes a kiosk input device and a kiosk display;

wherein each respective ID badge has a microcontroller in communication with a plurality of LEDs and a power source for conveying information to a wearer of said respective ID badge; and wherein said CPU includes means for guiding an ID badge wearer to a destination determined by said wearer at a respective kiosk, said means for guiding including means for selectively actuating respective LED.

14. The system as in claim 13, wherein:

said plurality of ID readers is a plurality of RFID readers; and each said ID badge is an active RFID badge having a power source for powering said respective ID badge transmitter.

15. The system as in claim 13, wherein said CPU includes means for selectively associating together respective ID badges for allowing a wearer of one associated ID badge to locate a wearer of another associated ID badge.

16. The system as in claim 13, wherein:

said ID badge LEDs are positioned in an array to indicate direction, each respective LED having a respective position in said array indicative of a respective direction; and said means for guiding includes means for selectively actuating a respective LED according to said position of the respective LED in said array.

*17. A system for monitoring a person's location in a defined area, comprising:*

*a plurality of ID readers, each respective ID reader having a reader transmitter and a reader receiver for transmitting and receiving signals, respectively, each respective ID reader having a predetermined reader transmission identifier different from a predetermined reader transmission identifier of any other said ID reader, each respective ID reader including means for including a respective reader transmission identifier in a respective signal;*

*a plurality of ID badges remote from said plurality of ID readers, each respective ID badge having a badge receiver for receiving query signals from a respective ID reader and a badge transmitter for transmitting reply signals to a respective ID reader, each respective badge transmitter having a predetermined badge transmission identifier different from a predetermined badge transmission identifier of any other said badge transmitter, each respective ID badge including means for including a respective badge transmission identifier in a respective reply signal;*

*a CPU in communication with a data storage unit for maintaining ID badge information, said CPU including means for recognizing a respective badge transmission identifier and means for associating said respective badge transmission identifier with a corresponding ID badge, said CPU including means for recognizing a respective reader transmission identifier and means for associating said respective reader transmission identifier with a corresponding ID reader;*

*means for communicating between said CPU and said plurality of ID readers;*

*a plurality of kiosks remotely positioned in a spaced-apart relationship relative to said CPU for allowing a respective wearer of a respective ID badge to access information from said CPU pertinent to said wearer;*

*means for communicating between said CPU and said plurality of kiosks;*

*wherein:*

*said CPU includes means for associating a respective amount of money with a respective ID badge; and*

*said CPU includes means for updating a respective amount of money associated with a respective ID badge.*

*18. The system as in claim 17, wherein:*

*at least one kiosk includes a money accepter; and*

*said means for updating said respective amount of money associated with said respective ID badge is according to an amount of money accepted by said accepter.*

*19. The system as in claim 17, wherein said means for updating said respective amount of money associated with said respective ID badge is according to a quantity of tickets purchased using said respective ID badge.*

*20. The system as in claim 17, wherein:*

*said plurality of ID readers is a plurality of RFID readers; and*

*said plurality of ID badges is a plurality of RFID badges.*

* * * * *